United States Patent
Lee et al.

(10) Patent No.: US 10,808,886 B2
(45) Date of Patent: Oct. 20, 2020

(54) FUEL-FILLING SYSTEM OF LPG VEHICLE

(71) Applicants: Hyundai Motor Company, Seoul (KR); Kia Motors Corporation, Seoul (KR)

(72) Inventors: Jae Min Lee, Chungcheongnam-do (KR); Jong Ki Kim, Gyeonggi-do (KR); Chang Han Kim, Gwangju (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 86 days.

(21) Appl. No.: 16/182,226

(22) Filed: Nov. 6, 2018

(65) Prior Publication Data

US 2020/0025335 A1   Jan. 23, 2020

(30) Foreign Application Priority Data

Jul. 17, 2018   (KR) .......................... 10-2018-0082664

(51) Int. Cl.
   *F17C 7/02*   (2006.01)

(52) U.S. Cl.
   CPC .......... *F17C 7/02* (2013.01); *F17C 2221/035* (2013.01); *F17C 2227/0135* (2013.01); *F17C 2270/0168* (2013.01)

(58) Field of Classification Search
   CPC ........... F02M 21/0287; F02M 21/0221; F02M 21/0212; F02M 37/10; B60K 2015/03013; F17C 7/02
   See application file for complete search history.

(56) References Cited

U.S. PATENT DOCUMENTS

| | | | |
|---|---|---|---|
| 5,479,906 A * | 1/1996 | Collie | F02M 21/0212 123/304 |
| 5,548,961 A * | 8/1996 | Luger | B60K 15/03006 62/47.1 |
| 9,163,784 B2 * | 10/2015 | Song | F17C 5/007 |
| 10,208,710 B2 * | 2/2019 | Kim | F02M 21/0224 |

FOREIGN PATENT DOCUMENTS

| | | |
|---|---|---|
| KR | 2010-0039050 A | 4/2010 |
| KR | 2013-0065025 A | 6/2013 |
| KR | 2013-0066011 A | 6/2013 |
| KR | 101734775 B1 | 5/2017 |

* cited by examiner

*Primary Examiner* — Timothy P. Kelly
(74) *Attorney, Agent, or Firm* — Mintz Levin Cohn Ferris Glovsky and Popeo, P.C.; Peter F. Corless

(57) ABSTRACT

A fuel-filling system of an LPG vehicle is provided. LPG remaining in an LPG bombe is forcibly fed to a fuel injection pipe using a fuel pump and is used to pressurize new LPG, which is injected into the fuel injection pipe, toward the LPG bombe. Thus, the LPG bombe is refilled with new LPG despite warmer weather conditions.

8 Claims, 3 Drawing Sheets

FUEL-FILLING SYSTEM OF LPG VEHICLE

CROSS-REFERENCE TO RELATED APPLICATION

This application claims under 35 U.S.C. § 119(a) the benefit of priority to Korean Patent Application No. 10-2018-0082664 filed on Jul. 17, 2018, the entire contents of which are incorporated herein by reference.

BACKGROUND

(a) Technical Field

The present disclosure relates to a fuel-filling system of an LPG vehicle, and more particularly, to a fuel-filling system of an LPG vehicle that refills an LPG bombe with LPG despite increased temperatures.

(b) Background Art

In general, as shown in FIG. 1 of the related art, a fuel-filling process in a liquefied-petroleum-gas (LPG) vehicle includes operating a filling pump 2 of an LPG filling station, supplying LPG from an LPG storage space 1 of the LPG filling station to a filling gun 3 as the result of operating the filling pump 2, and filling an LPG bombe of the vehicle with LPG using the LPG filling pressure of the filling gun 3.

However, when the external temperature is very high, e.g. in hot weather, the pressure in the LPG bombe of the vehicle may be greater than the LPG filling pressure, and thus, LPG filling may be impossible. In other words, when the pressure in the LPG bombe of the vehicle is greater than the LPG filling pressure, it may not be possible to fill the LPG bombe with LPG using the filling gun.

For example, when the atmospheric temperature in hot weather is about 40° C. or greater, the pressure in the LPG bombe of the vehicle becomes greater (e.g. about 16.5 bar) than the LPG filling pressure in the filling gun (e.g. 16.3 bar=the pressure in the LPG storage space of the LPG filling station, which is 8.3 bar+the LPG pumping pressure as the result of operating the filling pump, which is 8.0 bar). Consequently, it may not be possible to refill the LPG bombe with LPG using the filling gun.

The above information disclosed in this section is merely for enhancement of understanding of the background of the invention and therefore it may contain information that does not form the prior art that is already known in this country to a person of ordinary skill in the art.

SUMMARY

The present invention provides a fuel-filling system of an LPG vehicle, in which LPG remaining in an LPG bombe is forcibly fed to a fuel injection pipe using a fuel pump, and may be used to pressurize new LPG, which is injected into the fuel injection pipe, toward the LPG bombe, thereby making it possible to more easily refill the LPG bombe with new LPG even in hot weather.

In one aspect, the present invention provides a fuel-filling system of an LPG vehicle including an LPG bombe for storing LPG supplied thereto, a fuel pump mounted in the LPG bombe to supply LPG to an engine, a fuel injection pipe that connects a fuel injection port to a filling port of the LPG bombe, and a fuel pressurizing line mounted between an outlet of the fuel pump and the fuel injection pipe. The LPG remaining in the LPG bombe may flow along the fuel pressurizing line due to the pumping force of the fuel pump operated in response to a control signal from a controller, and pressurizes new LPG, injected into the fuel injection pipe, toward the LPG bombe.

In an exemplary embodiment, the fuel-filling system may further include an LPG sensor mounted at a predetermined position of the fuel injection pipe, the LPG sensor being configured to sense new LPG injected into the fuel injection pipe and to transmit a sensing signal to the controller. In another exemplary embodiment, the LPG sensor may be mounted to a fuel filter provided at a predetermined position of the fuel injection pipe, and may be configured to sense new LPG that is filtered by the fuel filter.

In addition, the LPG sensor may include a conductor configured to sense LPG through contact therewith, a covering member that surrounds the conductor, a mounting block that surrounds the outer circumferential surface of the covering member, and a signal transmission line that extends from the conductor. The fuel pressurizing line may diverge from a fuel supply line connecting the outlet of the fuel pump to the engine. A three-way solenoid valve may be mounted at a point at which the fuel pressurizing line diverges from the fuel supply line, the three-way solenoid valve may be operated by the controller to be turned on or off.

When the three-way solenoid valve is turned on, the outlet of the fuel pump and the fuel pressurizing line may communicate with each other, and when the three-way solenoid valve is turned off, the outlet of the fuel pump and the engine may communicate with each other. The fuel-filling system may further include a check valve mounted in the fuel pressurizing line to prevent LPG from flowing back to the LPG bombe. In addition, the fuel-filling system may include an overfilling prevention valve mounted to the filling port of the LPG bombe, and a spray unit mounted to an outlet of the overfilling prevention valve to atomize and spray LPG in a mist form.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
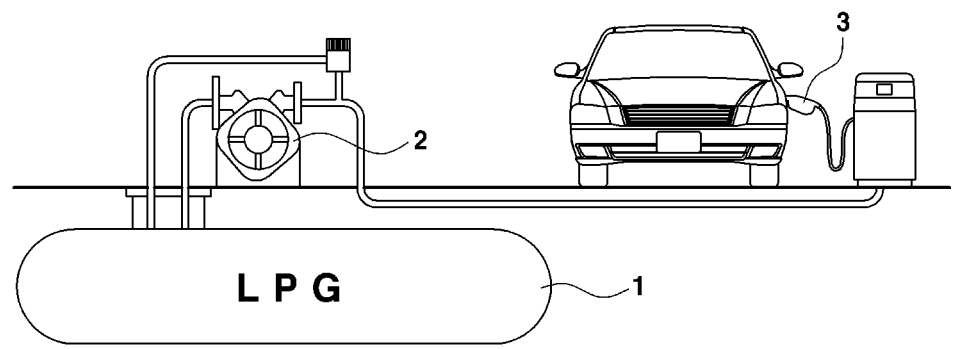
FIG. 1 is a view schematically showing a fuel-filling process of an LPG vehicle according to the related art.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes, will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Figure 2:
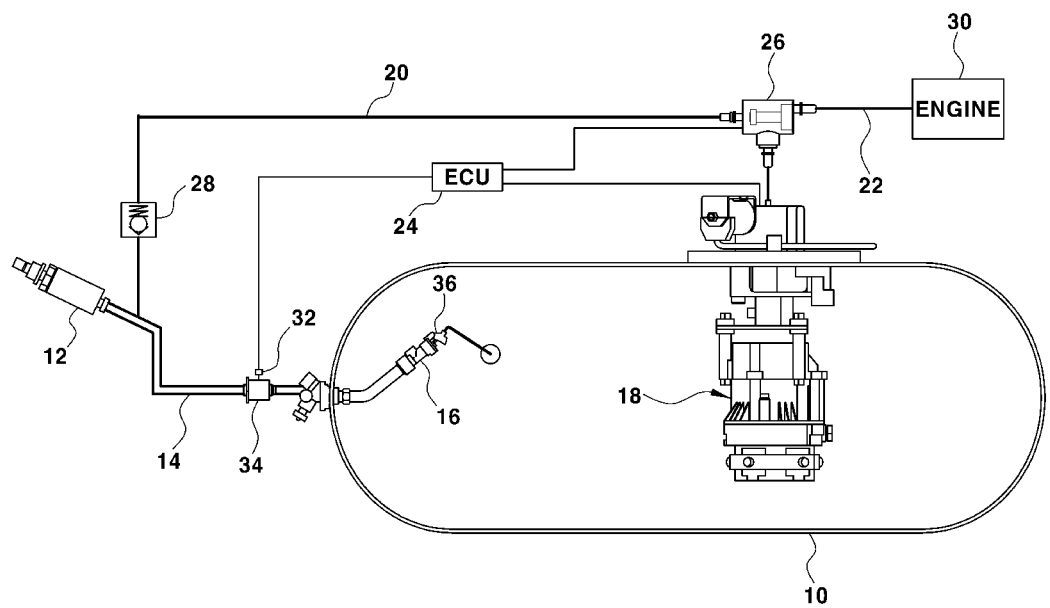
FIG. 2 is a constitutional view showing a fuel-filling system of an LPG vehicle according to an exemplary embodiment of the present invention.

FIG. 2 is a constitutional view showing a fuel-filling system of a liquefied-petroleum-gas (LPG) vehicle according to the present invention. As shown in FIG. 2, a fuel injection pipe 14 for supplying LPG connects a fuel injection port 12 mounted in an outer panel of a vehicle to a filling port of an LPG bombe 10. The filling port of the LPG bombe 10 may include an overfilling prevention valve 16 for constantly adjusting the amount of LPG that is supplied to the bombe. A fuel pump 18 for feeding LPG to an engine 30 may be installed in the LPG bombe 10.

When the external temperature is very high, e.g. in hot weather, the pressure in the LPG bombe 10 may be greater than the filling pressure of LPG that is injected into the fuel injection port 12 and the fuel injection pipe 14 from a filling gun, and thus, the LPG bombe may be unable to be filled with LPG. Therefore, according to the present invention, a fuel pressurizing line 20 may be mounted between the outlet of the fuel pump 18 and the inlet of the fuel injection pipe 14. The LPG remaining in the LPG bombe 10 (e.g., high-temperature LPG present in the high-pressure bombe) may flow along the fuel pressurizing line 20 due to the pumping force of the fuel pump 18, which is operated in response to a control signal from a controller 24, and then pressurizes new LPG, which is injected into the fuel injection pipe 14 from the filling gun, toward the LPG bombe 10. Accordingly, it may be possible to more easily refill the LPG bombe with LPG even in hot weather.

The fuel pressurizing line 20 may diverge from a fuel supply line 22, which connects the outlet of the fuel pump 18 to the engine 30. In other words, a first end of the fuel pressurizing line 20 may be connected to the fuel supply line 22, and a second end thereof (e.g., an opposite end) may be connected to the inlet of the fuel injection pipe 14 via a quick coupling. In addition, a three-way solenoid valve 26, turned on or off by the controller 24, may be disposed at the point at which the fuel pressurizing line 20 diverges from the fuel supply line 22.

In the engine-on state, the three-way solenoid valve 26 may be turned off by the controller 24, and thus, the outlet of the fuel pump 18 and the engine 30 may communicate with each other. Accordingly, the LPG in the LPG bombe 10 may be supplied to the engine 30 through the fuel supply line 22 by the operation of the fuel pump 18. When it is desired to fill the LPG bombe with LPG in the engine-off state, the controller 24 may be configured to turn on the three-way solenoid valve 26 in response to receiving an engine-off signal and a signal from a position sensor (not shown), configured to sense opening or closing of a fuel-filling cap (not shown), and thus, the outlet of the fuel pump 18 and the fuel pressurizing line 20 may communicate with each other.

Accordingly, in the engine-off state, the LPG remaining in the LPG bombe 10 (e.g., high-temperature LPG present in the high-pressure bombe) may flow along the fuel pressurizing line 20 via the three-way solenoid valve 26 due to the pumping force of the fuel pump 18, operated in response to a control signal from the controller 24, and then pressurizes new LPG, which is injected into the fuel injection pipe 14 from the filling gun, toward the LPG bombe 10. In addition, a check valve 28 may be mounted in the fuel pressurizing line 20 to prevent the residual LPG, flowing from the LPG bombe 10 to the fuel injection pipe 14, from flowing back to the LPG bombe 10. To determine whether new LPG is injected into the fuel injection pipe 14 from the filling gun, an LPG sensor 32 may be mounted to a predetermined position of the fuel injection pipe 14 to transmit an LPG sensing signal to the controller 24.

Figure 3:
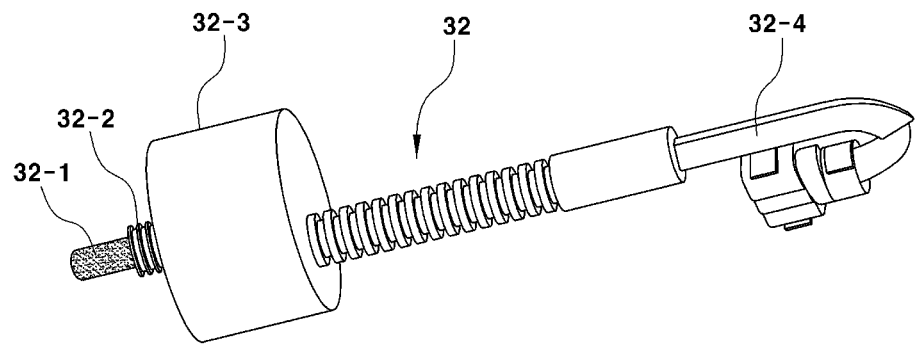
FIG. 3 is a view schematically showing an LPG sensor of the fuel-filling system of an LPG vehicle according to an exemplary embodiment of the present invention.

As shown in FIG. 3, the LPG sensor 32 may include a conductor 32-1 configured to sense LPG through the contact therewith, a covering member 32-2 that surrounds and protects the outer circumferential surface of the conductor 32-1 other than the distal end portion of the conductor 32-1, a mounting block 32-3 that surrounds the outer circumferential surface of the covering member 32-2 to be coupled to the outer circumferential surface of the fuel injection pipe 14, and a signal transmission line 32-4 extending from the conductor 32-1 to transmit a signal from the conductor 32-1 to the controller 24.

The LPG sensor 32 may be modularized with a fuel filter 34, disposed at a predetermined position of the fuel injection pipe 14 to remove foreign substances from LPG, and thus, the LPG sensor 32 may be configured to sense new LPG that is filtered by the fuel filter 34. The distal end portion of the fuel injection pipe 14 may be connected to the filling port of the LPG bombe 10. The overfilling prevention valve 16 for constantly adjusting the amount of LPG that is supplied to the bombe may be mounted to a portion of the filling port that is located inside the bombe.

A spray unit 36 configured to atomize and spray LPG in a mist form may be mounted to the outlet of the overfilling prevention valve 16. The spray unit 36 may be configured to atomize liquid LPG into a gas phase through a high-speed jet and spray the atomized fuel into the bombe 10 in a mist form. Accordingly, heat exchange between the sprayed LPG and the heat in the high-temperature bombe may be realized more easily, as will be described later.

Figure 4:
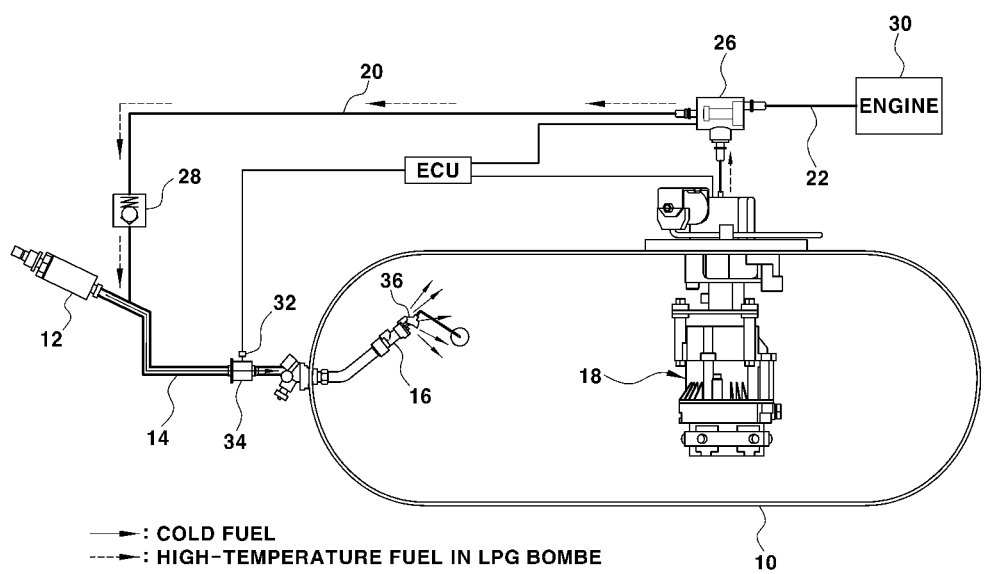
FIG. 4 is a constitutional view showing the operation of refilling an LPG bombe with LPG in hot weather in the fuel-filling system of an LPG vehicle according to an exemplary embodiment of the present invention.
Figure 5:
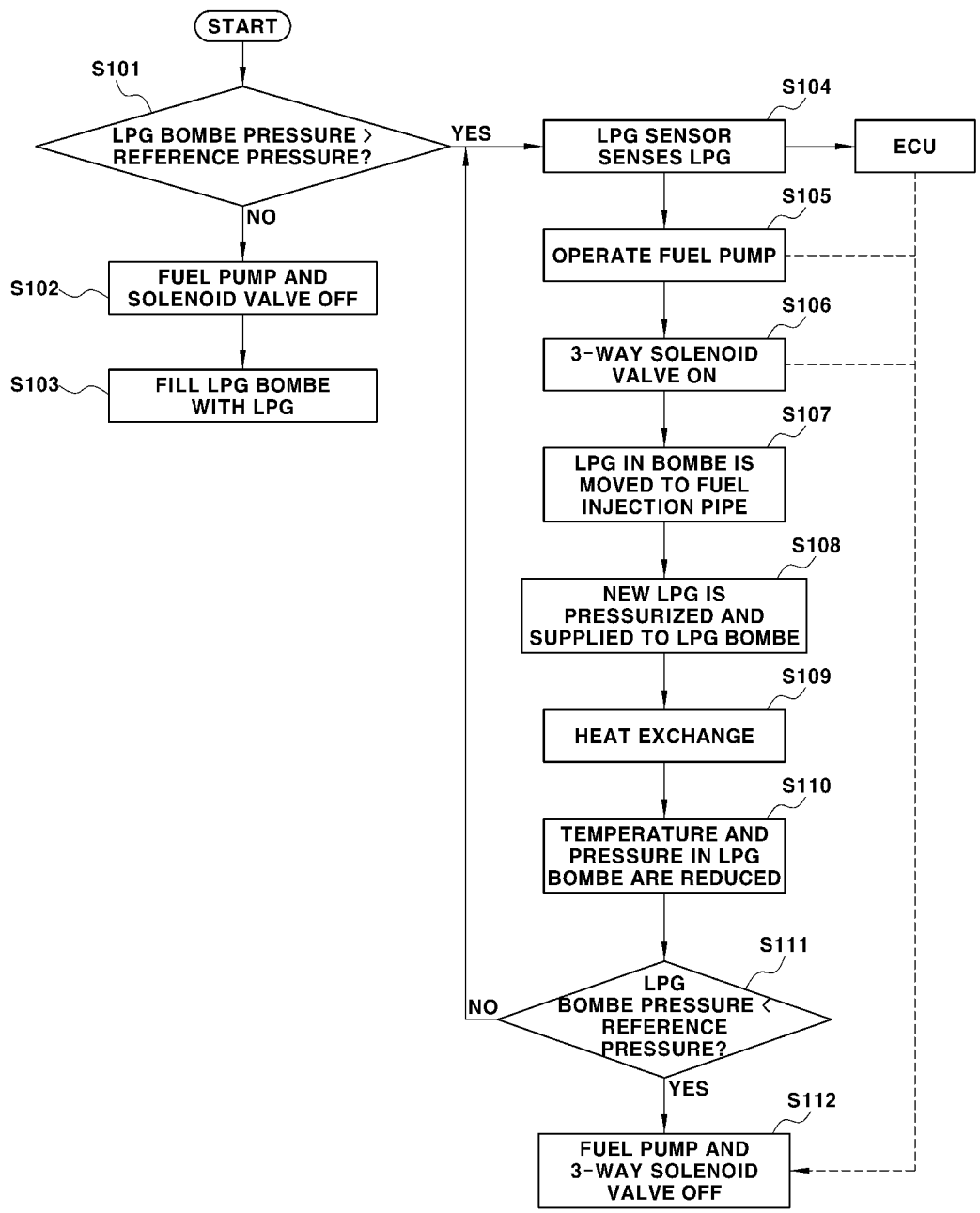
FIG. 5 is a flowchart showing the operation and the control process of the fuel-filling system of an LPG vehicle according to an exemplary embodiment of the present invention.

Hereinafter, the operation of the LPG filling system according to the present invention with the above-stated construction will be described. FIG. 4 is a constitutional view showing the operation of refilling the bombe with LPG in hot weather (e.g., greater than 40° C.) in the fuel-filling system of an LPG vehicle according to the present invention. FIG. 5 is a flowchart showing the operation and the control process of the fuel-filling system of an LPG vehicle according to the present invention.

First, the pressure in the LPG bombe 10 may be sensed using a pressure sensor (not shown), and the sensed pressure value may be transmitted to the controller. Subsequently, the controller may be configured to compare the pressure in the LPG bombe 10 with a reference pressure (e.g. about 12 bar) (S101). In response to determining that the pressure in the LPG bombe is less than the reference pressure (e.g. the LPG filling pressure of the filling gun), the controller 24 may be configured to maintain the three-way solenoid valve 26 in the off state (S102).

Since the pressure in the LPG bombe is less than the LPG filling pressure of the filling gun, new LPG, which is injected into the fuel injection port 12 from the filling gun, may be supplied to the LPG bombe 10 via the fuel injection pipe 14 and the overfilling prevention valve 16 (S103). In response to determining that the pressure in the LPG bombe is equal to or greater than the reference pressure (e.g. the LPG filling pressure of the filling gun), the controller 24 may be configured to forcibly feed the LPG remaining in the LPG bombe 10 (e.g., high-temperature LPG present in the high-pressure bombe) into the fuel injection pipe 14 along the fuel pressurizing line 20, and thus, new LPG is pressurized toward the LPG bombe 10.

Accordingly, the LPG sensor 32 may be configured to sense whether LPG is actually being supplied, i.e. whether LPG is being injected into the fuel injection pipe 14 (S104). In particular, new LPG, injected into the fuel injection port 12 from the filling gun, may be unable to be supplied to the LPG bombe 10 due to the relatively high pressure in the LPG bombe 10, but may flow to the fuel injection pipe 14. Therefore, the LPG sensor 32 may be configured to sense LPG that is injected into the fuel injection pipe 14 and transmit a sensing signal to the controller 24.

Subsequently, the controller 24 may be configured to operate the fuel pump 19 in response to the sensing signal from the LPG sensor 32 (S105) and turn on the three-way solenoid valve 26 (S106). As the result of turning on the three-way solenoid valve 26, the outlet of the fuel pump 18 and the fuel pressurizing line 20 communicate with each other. Subsequently, the LPG remaining in the LPG bombe 10 (high-temperature LPG present in the high-pressure bombe) may flow along the fuel pressurizing line 20 via the three-way solenoid valve 26 due to the pumping force of the fuel pump 18, and then may be moved into the fuel injection pipe 14 (S107).

Further, the residual LPG (high-temperature LPG present in the high-pressure bombe), which has been moved into the fuel injection pipe 14, pressurizes new LPG, injected into the fuel injection pipe 14 through the fuel injection port 12 from the filling gun, toward the LPG bombe 10, and thus, the LPG bombe 10 may be filled with new LPG despite the increased temperature (S108). The LPG may be atomized into a gas phase through a high-speed jet and sprayed into the LPG bombe 10 in a mist form by the spray unit 36. Accordingly, heat exchange between the sprayed LPG and the heat in the high-temperature bombe may be realized more easily (S109). Due to this heat exchange, the temperature and the pressure in the LPG bombe 10 may be reduced (S110). When the pressure in the LPG bombe 10 becomes less than the reference pressure due to the above heat exchange (S111), the controller 24 may be configured to stop the operation of the fuel pump 18, and turn off the three-way solenoid valve 26 simultaneously therewith (S112).

As is apparent from the above description, the present invention has the following effects.

First, when the external temperature is very high, e.g. in hot weather (i.e. in the summer), even when the pressure in an LPG bombe is greater than the LPG filling pressure of a filling gun, LPG remaining in the LPG bombe may be forcibly fed to a fuel injection pipe using a fuel pump, and may be used to pressurize new LPG, injected into the fuel injection pipe from the filling gun, toward the LPG bombe. Accordingly, it may be possible to more easily refill the LPG bombe with LPG even in hot weather.

Second, when LPG, which is relatively cold compared with the temperature in the LPG bombe (e.g., LPG stored in an underground LPG storage space of an LPG filling station), may be pressurized and supplied to the LPG bombe, the LPG may be atomized into a gas phase through a high-speed jet and sprayed into the LPG bombe in a mist form by a spray unit, and thus, the temperature and the pressure in the LPG bombe may be reduced. Accordingly, it may be possible to more easily refill the LPG bombe with LPG even in hot weather.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A fuel-filling system of a liquefied-petroleum-gas (LPG) vehicle, comprising:
   an LPG bombe configured to store LPG supplied therein;
   a fuel pump mounted in the LPG bombe to supply LPG to an engine;
   a fuel injection port configured to couple with a filling gun;
   a filling port for supplying LPG into the LGP bombe;
   a fuel injection pipe that connects a fuel injection port to a filling port of the LPG bombe;

a fuel pressurizing line mounted between an outlet of the fuel pump and the fuel injection pipe; and a controller configured to operate the fuel pump to generate a pumping force to cause LPG remaining in the LPG bombe to flow along the fuel pressurizing line, and pressurize new LPG, injected into the fuel injection pipe from the filling gun, toward the LPG bombe.

2. The fuel-filling system of claim 1, further comprising:

an LPG sensor mounted at a predetermined position of the fuel injection pipe and configured to sense new LPG injected into the fuel injection pipe and transmit a sensing signal to the controller.

3. The fuel-filling system of claim 2, wherein the LPG sensor is mounted to a fuel filter provided at a predetermined position of the fuel injection pipe, and is configured to sense new LPG that is filtered by the fuel filter.

4. The fuel-filling system of claim 2, wherein the LPG sensor includes:

a conductor configured to sense LPG through contact therewith;

a covering member that surrounds the conductor;

a mounting block that surrounds an outer circumferential surface of the covering member; and a signal transmission line that extends from the conductor.

5. The fuel-filling system of claim 1, further comprising a fuel supply line connecting the outlet of the fuel pump to the engine, wherein the fuel pressurizing line diverges from the fuel supply line, and wherein a three-way solenoid valve is mounted at a point at which the fuel pressurizing line diverges from the fuel supply line, the three-way solenoid valve being turned on/off under control of the controller.

6. The fuel-filling system of claim 5, wherein when the three-way solenoid valve is turned on, the outlet of the fuel pump and the fuel pressurizing line communicate with each other, and when the three-way solenoid valve is turned off, the outlet of the fuel pump and the engine communicate with each other.

7. The fuel-filling system of claim 1, further comprising:

a check valve mounted in the fuel pressurizing line to prevent LPG from flowing back to the LPG bombe.

8. The fuel-filling system of claim 1, further comprising:

an overfilling prevention valve mounted to the filling port of the LPG bombe; and a spray unit mounted to an outlet of the overfilling prevention valve to atomize and spray LPG in a mist form.

* * * * *